United States Patent [19]

Beach et al.

[11] Patent Number: 5,005,622

[45] Date of Patent: Apr. 9, 1991

[54] BLOCK AND LOCKING MECHANISM FOR A STUMP GRINDING CUTTER BIT AND METHOD OF SECURING AND RETAINING

[75] Inventors: Wayner H. Beach, Roaring Spring, Pa.; Leroy E. Den Besten, Valatie, N.Y.; Don C. Rowlett, Bedford, Pa.

[73] Assignee: Kennametal Inc., Latrobe, Pa.

[21] Appl. No.: 481,490

[22] Filed: Feb. 16, 1990

[51] Int. Cl.⁵ ............................................. B27G 13/04
[52] U.S. Cl. ........................................ 144/241; 299/93; 144/2 N; 144/235
[58] Field of Search ........................... 299/79, 88, 89, 91, 299/92, 93; 37/142 R, 142 A, 2 R; 144/2 N, 235, 241

[56] References Cited

U.S. PATENT DOCUMENTS

| | | |
|---|---|---|
| 608,272 | 8/1898 | Schleicher . |
| 1,164,659 | 12/1915 | Moore .............................. 144/2 N |
| 1,534,856 | 4/1925 | McKoy et al. ................... 144/2 N |
| 1,859,717 | 5/1932 | Rutrle ............................ 37/142 R |
| 2,452,081 | 10/1948 | Sullinger ........................... 299/93 |
| 2,686,663 | 8/1954 | Bruestle ............................ 299/91 |
| 2,798,715 | 7/1957 | Brown . |
| 2,976,028 | 3/1961 | Saxman . |
| 2,992,664 | 7/1961 | de Shano . |
| 3,198,224 | 8/1965 | Hiley .............................. 144/2 N |
| 3,570,566 | 3/1971 | McCreery ...................... 144/235 X |
| 3,732,905 | 5/1973 | Pickel .............................. 144/2 Z |
| 3,797,544 | 3/1974 | Ver Ploeg ...................... 144/2 N X |
| 3,844,619 | 10/1974 | Hallar ............................. 299/92 |
| 3,935,887 | 2/1976 | Van Zante et al. ............. 144/235 |
| 4,009,837 | 3/1977 | Schnyder ...................... 144/163 X |
| 4,147,193 | 4/1979 | Kivimaa ......................... 144/235 |
| 4,214,617 | 7/1980 | McKenry ........................ 144/2 N |
| 4,271,879 | 6/1981 | Shivers, Jr. et al. ............ 144/2 N |
| 4,337,980 | 7/1982 | Krekeler ........................... 299/91 |
| 4,693,518 | 9/1987 | Sulosky et al. .................... 299/93 |
| 4,757,848 | 7/1988 | Mollberg, Jr. .................... 144/2 N |
| 4,759,394 | 7/1988 | Clemenson ....................... 144/235 |

FOREIGN PATENT DOCUMENTS

| | | | |
|---|---|---|---|
| 996007 | 8/1976 | Canada .......................... 144/2 N |
| 614221 | 7/1978 | U.S.S.R. .......................... 299/79 |
| 750612 | 6/1956 | United Kingdom ............ 299/88 |
| 1486549 | 10/1977 | United Kingdom ............ 299/93 |
| 1550353 | 8/1979 | United Kingdom ............ 299/91 |

Primary Examiner—Ramon S. Britts
Assistant Examiner—David J. Bagnell
Attorney, Agent, or Firm—Larry R. Meenan

[57] ABSTRACT

A block and locking mechanism and cutter bit for a stump grinding machine. The block having a shank receiving cavity being defined by a surrounding irregularly shaped inner wall that includes a pair of opposed end walls interconnected by a pair of opposed side walls with each side wall being tapered inwardly from the opposed end walls such that the cavity has a varying width from end wall to end wall. The cutter bit including a shank adapted to be received within the cavity of the block with the shank having a cross-section that generally conforms to the shape of the cavity such that the cutter bit is prevented from rotating when inserted within the cavity and held within the block. The cutter bit and block also include, respectively, retaining notches formed on opposite sides of the cutter bit shank and angled set screws disposed within set screw bores formed in the block and adapted to extend into engagement with the respective retaining notches formed on opposite sides of the shank so as to retain the shank within the block.

14 Claims, 2 Drawing Sheets

BLOCK AND LOCKING MECHANISM FOR A STUMP GRINDING CUTTER BIT AND METHOD OF SECURING AND RETAINING

BACKGROUND OF THE INVENTION

Typically, stump grinding machines include a plurality of circumferential teeth mounted about the periphery of a rotatively driven wheel. In a stump grinding operation, the wheel is positioned adjacent a stump and is rotatively driven so that the teeth about the periphery of the wheel make repeated cuts through the stump, resulting in the stump being effectively ground down and destroyed.

Obviously, stump grinding can place tremendous demands on the teeth and structure supporting the teeth about the rotating wheel. The teeth themselves must be strong and rugged and be able to withstand the loads constantly placed on them by continuous stump grinding. Moreover, the mounting block for receiving and supporting the teeth about the wheel must be adequately designed to hold and retain the teeth while at the same time being effective to absorb the blows being transferred to it by the teeth.

SUMMARY AND OBJECTS OF THE INVENTION

The present invention relates to a cutter bit and block assembly for a stump grinding machine. In particular, the invention entails a block structure designed to receive a flat stump grinding cutter bit. The block assembly includes a shank receiving cavity that includes an irregularly shaped surrounding wall structure for receiving the shank of the cutter bit which is of a like shape. Once inserted within the shank receiving cavity, the shank of the cutter bit is prevented from rotating by the engagement of the surrounding irregularly shaped wall of the block assembly with the outer surface of the shank.

Finally, the cutter bit and block assembly of the present invention includes positive retention means for securing the shank of the cutter bit within the block assembly. In this regard, there is provided a pair of offset set screws that are threaded through the block assembly and include a lower terminal end that engage retention notches formed in the shank. Consequently, once the set screws are screwed down into engagement with the retention notches, it is appreciated that the shank is securely held within the block assembly.

It is therefore an object of the present invention to provide a block and locking mechanism for a stump grinding cutter bit that provides for and maintains positive retention of the cutter bit within the block.

Another object of the present invention resides in the provision of a block and locking mechanism for a stump grinding cutter bit that provides positive retention of the cutter bit within the block about opposite sides of the cutter bit thereby allowing side access to the locking mechanism associated with the block.

Another object of the present invention resides in the provision of a stump grinding bit and block assembly wherein the block is provided with an inclined seat for receiving a like inclined support surface integrally formed with the shank of the bit.

Still a further object of the present invention resides in the provision of a stump grinding cutter bit and block assembly that reduces the quantity of material required for the total assembly but yet increases the strength of the assembly especially under the head of the tool where the greatest loads are applied.

Another object of the present invention resides in the provision of a block and locking mechanism for a stump grinding cutter bit of the character referred to above wherein the block is provided with a pair of angled set screws for axially confining the cutter bit within the block and which are accessible from opposite sides of the block when the same is secured to the carrier wheel of the stump grinding machine.

Other objects and advantages of the present invention will become apparent and obvious from a study of the following description and the accompanying drawings which are merely illustrative of such invention.

DETAILED DESCRIPTION OF THE INVENTION

Figure 6:
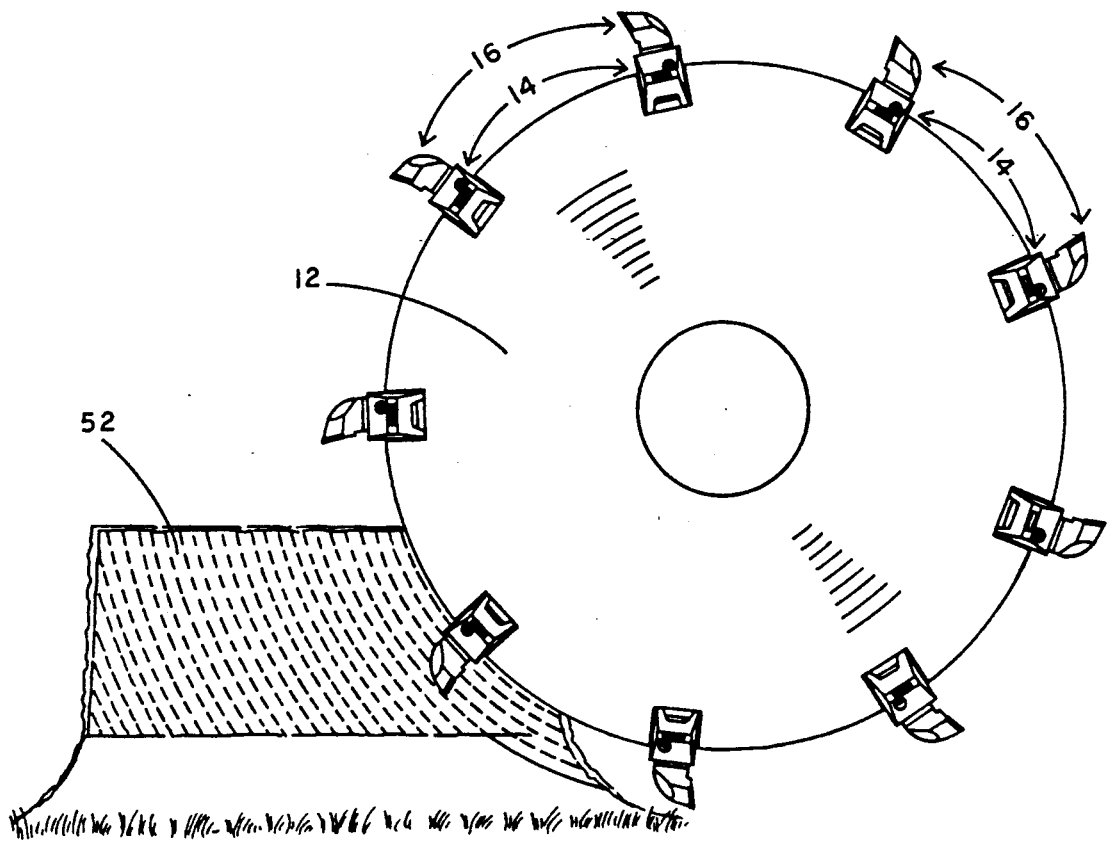
FIG. 6 is a schematic view illustrating the cutter bit carrier wheel of a stump grinding machine and particularly showing how the cutter bits carried by the wheel make successive cuts through a stump.

With further reference to the drawings, a stump grinding device is shown in FIG. 6. Basically, the stump grinding device includes a cutter bit carrier which in the present case comprises a powered rotating wheel indicated by the numeral 12. The powered rotating wheel 12 includes a plurality of circumferentially spaced block and locking mechanisms 14 secured about the periphery of the wheel. Secured within each block and locking mechanism 14 is a stump grinding cutter bit indicated generally by the numeral 16.

The present invention principally deals with the block and locking mechanism 14 and the cutter bit 16. But for purposes of providing a more complete and unified understanding of the present invention, the block and locking mechanism 14 and cutter bit 16 are shown in somewhat schematic form attached to a conventional stump grinding rotating wheel 12. It is appreciated, as noted above, that rotating wheel 12 forms a part of a conventional stump grinding machine and is powered by a power source. For a more complete and unified understanding of stump grinding machines in general, one is referred to a commercially available stump grinding machine such as that produced by Vermeer Mfg. Co., of Pella, Iowa.

Turning to the block and locking mechanism 14 it is seen that the block portion of that assembly includes a pair of half block sections 14a welded together in face to face relationship so as to define a shank cavity 19 therebetween. As seen in the drawings, the respective half block sections 14a include a weld seam 18 that extends vertically along each side of the block. It should be pointed out that the block could be cast formed and as such, the half sections would form portions of the cast block.

Now viewing each half section 14a in more detail, it is seen that each half section includes an outer exterior portion that includes a top ridge 20a and a pair of side strips 20b. In addition, each outer section includes a series of back surfaces that includes an upper back 20c, a mid-back 20d, and a lower back area 20e.

Also, each half section 14a includes what is referred to as an inner section that forms a part of the shank cavity 19. As seen in the drawings, the inner section includes a generally w-shaped inner side wall structure that is indicated generally by the numeral 22. Viewing this generally w-shaped inner side wall structure in more detail, it is seen that the same is comprised of a pair of generally u-shaped sections 22a and 22b that merge to form a mid-seam 22c.

Forming a part of the generally w-shaped inner section is a pair of abutting inwardly facing edges 22d and 22e. Extending from the outer portion of each abutting edge 22d and 22e is a weld face 22f that lies adjacent a further outer edge 22g.

As seen in the drawings, to form the block portion of the block and locking mechanism 14, respective abutting edges 22d and 22e from a pair of half block sections 14a are joined together and secured by the weld seam 18.

Each generally w-shaped inner wall structure 22 includes an upper inclined tool seat 24. Tool seat 24 extends at an angle with respect to the vertical axis of the shank cavity 19 and assumes a generally v-shape. Although the angle of inclination of the tool seat 24 may vary, in a typical design it is contemplated that the tool seat would be angled at an angle of approximately 15 degrees with respect to the axis of the shank cavity 19 or the axis of the shank of the cutter bit to be hereafter described.

In each half section there is formed a threaded bore 26 that extends at an angle completely through the wall structure of the entire half section 14a. Each threaded bore 26 is designed to receive a set screw type retaining bolt 28 that is specifically designed to engage and retain the shank of the cutter bit, again to be described hereafter.

Now, considering the cutter bit 16, it is seen that the same is of the flat stump grinding cutter bit type. Cutter bit 16 includes a shank indicated generally by the numeral 30 and a head 32 that includes a carbide insert 34.

Shank 30 is designed to mate with the receiving cavity 19 formed by a pair of half block sections 14a that have been secured together. Thus, the cross sectional shape or area of the shank 30 is designed to correspond with the cross-sectional area or shape of the shank cavity 19 which is in fact defined by the generally w-shaped inner walls 22 of the respective half sections 14a.

Figure 1:
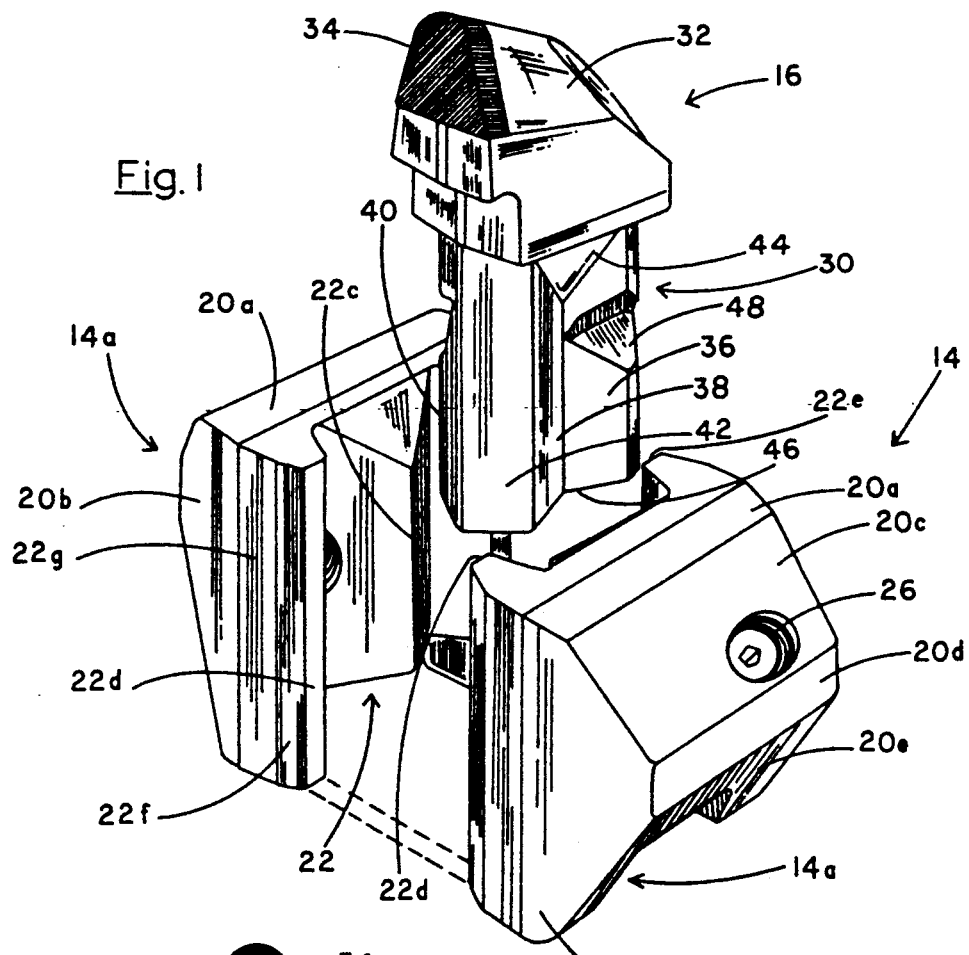
FIG. 1 is a perspective exploded view illustrating the two half sections of the mounting block and the cutter bit.
Figures 2, 3:
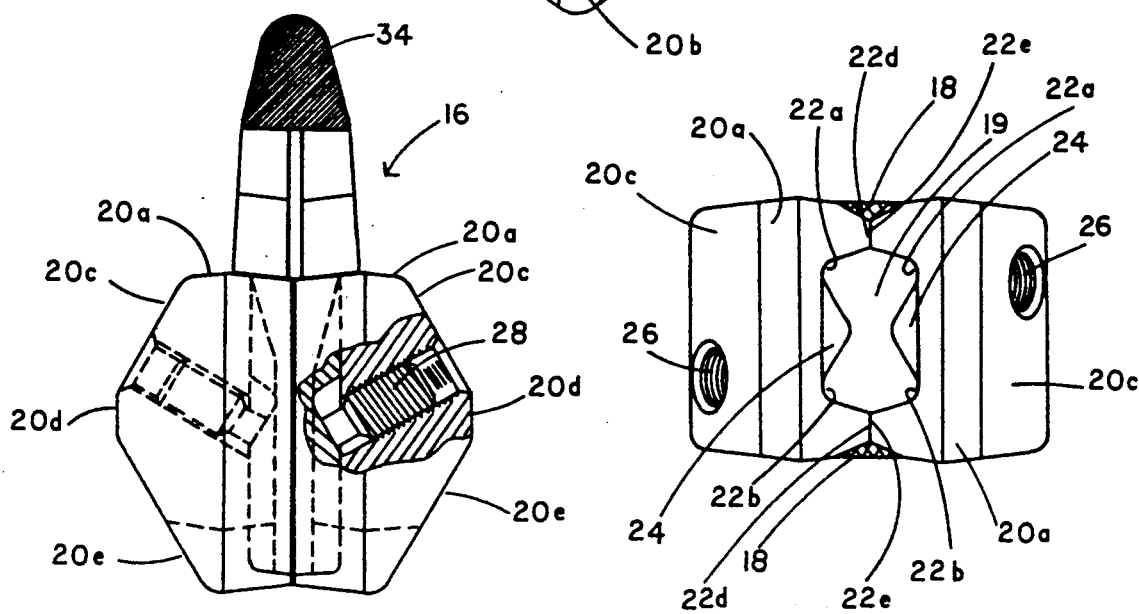
FIG. 2 is a side elevational view of the mounting block and cutter bit particularly illustrating the angled set screws for retaining the shank of the cutter bit within the mounting block.
FIG. 3 is a top plan view of the mounting block showing the particular shape of the shank receiving cavity formed therein.
Figure 4:
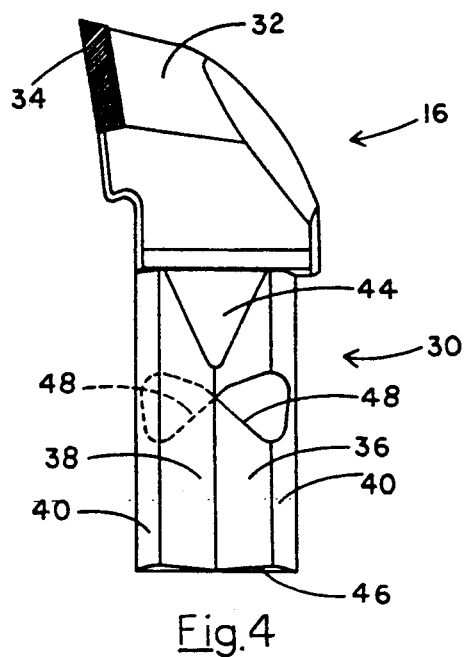
FIG. 4 is a side elevational view of the stump grinding cutter bit.
Figure 5:
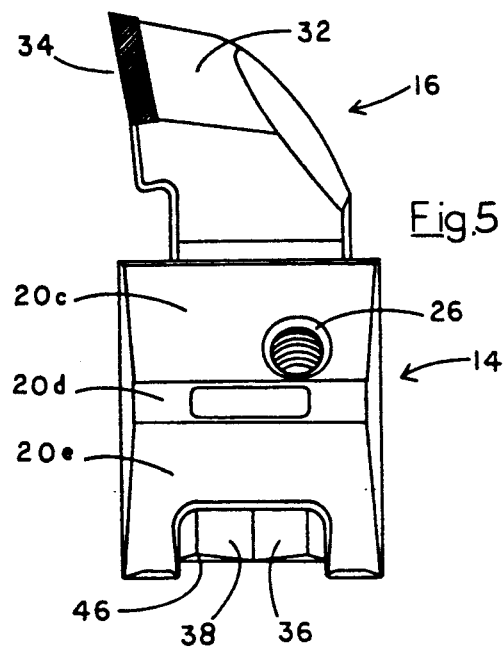
FIG. 5 is side elevational view illustrating the cutter bit mounted within the mounting block.

Viewing the design of shank 30 in more detail, it is seen that about each side of the shank 30 there is formed a generally v-shaped side structure that includes sides 36 and 38. Formed about each opposed end portion of shank 30, as viewed in FIG. 1, is a pair of end wall sections 40 and 42. It is appreciated that the end wall sections 40 and 42 tend to wrap around opposite end portions of the shank 30 and are contiguous with the v-shaped sides 36 and 38. But essentially the shape of shank 30 as determined by the v-shaped sides 36 and 38 coupled with the specific shape of end walls 40 and 42 form a cross-sectional shape that corresponds to the shape of the shank cavity 19 as illustrated in the drawings.

Formed on each side of the shank 30 is a tool support surface 44 that is designed to rest adjacent tool seat 24 formed on opposite sides of the mounting block 14. Tool support surface 44 is inclined upwardly and outwardly at approximately the same angle as the tool seat such that the same will rest flush there against when the cutter bit shank 30 is properly seated within the mounting block.

Formed in opposite sides of shank 30 is a pair of retaining notches 48. It is seen that the retaining notches 48 in the embodiment disclosed are offset with respect to each other. As will be appreciated, retaining notches 48 are designed to receive the terminal ends of the retaining bolts 28.

Finally, as seen in the drawings, shank 30 includes a bottom surface 46 that assumes a lowermost position within the mounting block 14.

It is appreciated that respective block and locking mechanisms 14 are secured in circumferential spaced relationship about the periphery of the rotary driven wheel 12 of the stump grinding machine. In particular, the rotary driven wheel 12 includes a series of outer transverse slots. Respective block and locking mechanisms 14 are secured within the slots by welding or other suitable means. The corresponding like shapes of the shank 30 and the receiving cavity 19 enable the shank 30 to be inserted into the receiving cavity 19 in such a fashion that there is formed a generally snug fit. As seen in the drawings, the surrounding wall structure of the shank cavity is irregularly shaped and because of the corresponding shape of the shank 30, the entire cutter bit 16 is prevented from rotating about the axis of the shank. To securely hold the shank within the mounting block 14 and to prevent the same from moving outwardly from the mounting block 14, the retaining bolts 28 are driven downwardly into engagement with the retaining notches 48 formed in the shank. The angle of the retaining bolts 28 with respect to the axis of the shank 30 is approximately 60° in the block and locking mechanism of the present invention.

In use, the design of the block and locking mechanism 14 allows side access for tightening and removal of the set retaining screws 28 when the block and locking mechanisms 14 are welded onto the driven wheel 12. The set screws maintain a positive retention force against the shank from both sides. When tightened, the set screws 28 force the tool down on the tool support surface 44 of the bit, maintaining it tight in the block and causes the shank to be locked into opposite corners of the block. This shank design coupled with the design of the mounting block conserves material and increases strength in the area under the head of the tool where the greatest loads are typically applied.

Because of the presence of the retaining set screws 28, it is appreciated that in order for the shank 30 to inadvertently exit the mounting block that the ends of the retaining bolts 28 must shear off.

In FIG. 6, there is illustrated a series of cutter bits 16 and mounting blocks 14 mounted on a stump grinding carrier wheel 12. As viewed therein, the carrier wheel is driven counterclockwise and the respective cutter bits 16 are passed successively through a stump 52 which is the subject of the stump grinding operation. It is appreciated that the carrier wheel 12 is moved back and forth across the stump in such a fashion that the cutter bits are brought into engagement with the stump on selected traverses. This basic stump grinding procedure is conventional.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range therein.

What is claimed is:

1. A block and locking mechanism for a stump grinding cutter bit comprising:
   (a) a block having a shank receiving cavity;
   (b) the shank receiving cavity being defined by a surrounding irregularly shaped inner wall that includes a pair of opposed end walls interconnected by a pair of opposed side walls with each side wall being tapered inwardly from the opposed end walls such that the shank cavity has a varying width from end wall to end wall;
   (c) a cutter bit having a shank adapted to be received within the shank cavity of the block with the shank formed with a cross-section that generally conforms to the shape of the shank cavity such that the cutter bit is prevented from rotating when inserted within the shank cavity and held within the block;
   (d) retaining notches formed on opposite sides of the cutter bit shank; and
   (e) angled set screw means disposed within set screw bores formed in the block and adapted to extend into engagement with the respective retaining notches formed on opposite sides of the shank so as to retain the shank within the block.

2. The block and locking mechanism of claim 1 wherein the block includes a pair of half sections and wherein each half section includes an upper inclined tool seat that extends generally upwardly and outwardly about a top portion of each respective side wall that forms a part of the shank cavity; and wherein the shank of the cutter bit includes a pair of inclined conforming tool support surfaces that generally engage and rest on the inclined seat surfaces forming a part of the opposed side walls of the shank cavity.

3. The block and locking mechanism of claim 2 wherein the set screw bores are disposed at an angle of approximately 60 degrees with respect to the axis of the shank of the cutter bit.

4. A cutter bit, block, and locking mechanism assembly for a stump grinding machine comprising:
   (a) a block having a shank receiving cavity formed by a pair of opposed generally w-shaped side walls;
   (b) a tool seat formed about the upper portion of each generally w-shaped side wall and including an inclined surface that extends generally upwardly and outwardly relative to the shank receiving cavity;
   (c) a cutter bit having a shank adapted to fit within the shank receiving cavity of the block;
   (d) the shank having opposed sides that generally conform to the shape of the generally w-shaped sides of the block such that when inserted into the cavity the shank fits generally snugly and is prevented from rotating within the cavity because of the engagement of the generally w-shaped side walls with the sides of the shank;
   (e) the shank including opposed inclined tool support surfaces that normally engage and rest on the tool seat formed about opposite side walls of the shank cavity;
   (f) retaining notches formed on opposite sides of the shank;
   (g) an angled threaded bore extending through opposite sides of the block; and
   (h) set screws threaded into the threaded bores and engageable with the retaining notches formed in the shank for retaining the cutter bit and shank within the block.

5. A block and locking mechanism for a stump grinding cutter bit comprising:
   (a) a block having a shank receiving cavity and surrounding wall structure;
   (b) a cutter bit having a shank adapted to be received within the shank cavity of the block;
   (c) retaining notches formed on opposite sides of the shank;
   (d) a pair of threaded throughbores extending through opposite sides of the surrounding wall structure of the block, each threaded throughbore extending at an angle with respect to the shank cavity formed within the block; and
   (e) a pair of angled set screws threaded through the threaded throughbores for engaging the retaining notches formed on opposite sides of the cutter bit shank and retaining the cutter bit shank within the block such that the cutter bit shank is held within the block by the cooperative action of the set screws which extend from opposite sides of the surrounding wall structure of the block into engagement with the cutter bit shank.

6. The block and locking mechanism of claim 5 wherein the threaded throughbores are disposed at an angle of approximately 60 degrees with respect to the axis of the shank of the cutter bit.

7. The block and locking mechanism of claim 5 wherein the shank cavity is formed by an irregularly shaped inner surrounding wall while the cutter bit of the shank includes a like irregularly shaped surrounding wall structure that permits the shank to be inserted within the cavity to yield a relatively snug fit and wherein the irregular conforming shapes of the cavity and shank prevent the shank from rotating within the cavity.

8. A method of securing and retaining a stump grinding cutter bit within a block, comprising the steps of:
   (a) inserting the shank of a cutter bit into a block, the cutter bit shank including a head, lower end portion, and retaining notches formed on opposite sides of the shank intermediately between the head and lower end portions;
   (b) extending a pair of set screws through opposite sides of the block;
   (c) angling the set screws such that they are directed generally inwardly and downwardly towards the lower end portion of the cutter bit shank disposed within the block; and
   (d) engaging both angled set screws with the retaining notches formed on opposite sides of the shank and tightening the screws against the retaining notches formed on the shank such that the shank is generally pushed downwardly within the block and retained from both sides of the block by the angled set screws.

9. The method of claim 8 including the step of angling the set screws such that they extend at an angle of approximately 60 degrees with respect to the axis of the shank of the cutter bit.

10. The method of claim 8 including the step of forming a shank cavity within the block that includes an irregularly shaped inner surrounding wall, and forming a like irregularly shaped surrounding wall about the shank of the cutter bit such that the irregular shapes of the cavity and the shank of the cutter bit match such that the shank is prevented from rotating when disposed within the cavity.

11. A block and locking mechanism for a stump grinding cutter bit comprising:
 (a) a block having a shank receiving cavity and surrounding wall structure;
 (b) a cutter bit having a shank adapted to be received within the shank cavity of the block;
 (c) retaining notches formed on opposite sides of the shank;
 (d) a pair of threaded throughbores extending through opposite sides of the surrounding wall structure of the block, each threaded throughbore extending at an angle with respect to the shank cavity formed within the block, wherein the threaded throughbores formed in the surrounding side wall structure of the block are at least slightly offset with respect to each other and wherein the retaining notches formed on opposite sides of the shank are likewise offset such that the notches formed in the shank align with the threaded throughbores; and
 (e) a pair of angled set screws threaded through the threaded throughbores for engaging the retaining notches formed on opposite sides of the cutter bit shank and retaining the cutter bit shank within the block such that the cutter bit shank is held within the block by the cooperative action of the set screws which extend from opposite sides of the surrounding wall structure of the block into engagement with the cutter bit shank.

12. A block and locking mechanism for a stump grinding cutter bit comprising:
 (a) a block having a shank receiving cavity, surrounding wall structure, and an upper inclined tool seat wherein the shank cavity is formed by an irregularly shaped inner surrounding wall;
 (b) a cutter bit having a shank adapted to be received within the shank cavity of the block, wherein the cutter bit shank includes an inclined conforming support surface that generally engages and rests on the inclined seat surface formed about the upper portion of the block, a like irregularly shaped surrounding wall structure that permits the shank to be inserted within the cavity to yield a relatively sung fit and wherein the irregular conforming shapes of the cavity and shank prevent the shank from rotating within the cavity;
 (c) retaining notches formed on opposite sides of the shank;
 (d) a pair of threaded throughbores extending through opposite sides of the surrounding wall structure of the block, each threaded throughbore extending at an angle with respect to the shank cavity formed within the block; and
 (e) a pair of angled set screws threaded through the threaded throughbores for engaging the retaining notches formed on opposite sides of the cutter bit shank and retaining the cutter bit shank within the block such that the cutter bit shank is held within the block by the cooperative action of the set screws which extend from opposite sides of the surrounding wall structure of the block into engagement with the cutter bit shank.

13. A method of securing and retaining a stump grinding cutter bit within a block, comprising the steps of:
 (a) inserting the shank of a cutter bit into a block, the cutter bit shank including a head, lower end portion, and retaining notches formed on opposite sides of the shank intermediately between the head and lower end portions;
 (b) extending a pair of set screws through opposite sides of the block;
 (c) angling the set screws such that they are directed generally inwardly and downwardly towards the lower end portion of the cutter bit shank disposed within the block;
 (d) engaging both angled set screws with the retaining notches formed on opposite sides of the shank and at least slightly offsetting the retention notches and angled set screws with respect to each other; and
 (e) tightening the screws against the retaining notches formed on the shank such that the shank is generally pushed downwardly within the block and retained from both sides of the block by the angled set screws.

14. A method of securing and retaining a stump grinding cutter bit within a block, comprising the steps of:
 (a) forming an inclined tool seat on the block and a conforming support surface on the cutter bit shank and urging the support surface formed on the cutter bit shank into seating engagement with the inclined tool seat formed in the block by tightening the angled set screws against the retention notches formed on the cutter bit shank;
 (b) inserting the shank of a cutter bit into a block, the cutter bit shank including a head, lower end portion, and retaining notches formed on opposite sides of the shank intermediately between the head and lower end portions;
 (c) extending a pair of set screws through opposite sides of the block;
 (d) angling the set screws such that they are directed generally inwardly and downwardly towards the lower end portion of the cutter bit shank disposed within the block; and
 (e) engaging both angled set screws with the retaining notches formed on opposite sides of the shank and tightening the screws against the retaining notches formed on the shank such that the shank is generally pushed downwardly within the block and retained from both sides of the block by the angled set screws.

* * * * *